US011441755B2

(12) United States Patent
Han et al.

(10) Patent No.: US 11,441,755 B2
(45) Date of Patent: Sep. 13, 2022

(54) ILLUMINATION DEVICE AND ELECTRONIC APPARATUS INCLUDING THE SAME

(71) Applicant: SAMSUNG ELECTRONICS CO., LTD., Suwon-si (KR)

(72) Inventors: Seunghoon Han, Seoul (KR); Jangwoo You, Seoul (KR); Minkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/497,583

(22) Filed: Oct. 8, 2021

(65) Prior Publication Data

US 2022/0026041 A1   Jan. 27, 2022

Related U.S. Application Data

(63) Continuation of application No. 16/577,621, filed on Sep. 20, 2019, now Pat. No. 11,175,010.

(60) Provisional application No. 62/733,840, filed on Sep. 20, 2018.

(30) Foreign Application Priority Data

Jul. 9, 2019   (KR) .................. 10-2019-0082826

(51) Int. Cl.
*F21V 5/00* (2018.01)
*F21V 5/04* (2006.01)
*H05B 47/105* (2020.01)

(52) U.S. Cl.
CPC .............. *F21V 5/004* (2013.01); *F21V 5/045* (2013.01); *H05B 47/105* (2020.01)

(58) Field of Classification Search
CPC ....... F21V 5/004; F21V 5/045; H05B 47/105; G01B 11/25; G06K 9/2036
See application file for complete search history.

(56) References Cited

U.S. PATENT DOCUMENTS

| 6,807,369 | B1 ‡ | 10/2004 | Tenmyo ................ F21V 5/045 396/175 |
| 7,474,680 | B2 ‡ | 1/2009 | Gruhlke ................ G06F 3/0317 372/29.014 |
| 8,179,497 | B2 ‡ | 5/2012 | Sugita ................ G02B 6/003 349/114 |
| 8,400,627 | B2 ‡ | 3/2013 | Jak ................ G01J 3/0208 356/225 |
| 2017/0006691 | A1 ‡ | 1/2017 | Rasmussen ............ H05B 47/19 |

(Continued)

FOREIGN PATENT DOCUMENTS

| CN | 105676478 B | ‡ | 8/2018 | ............ G02B 27/48 |
| CN | 105676478 B | | 8/2018 | |
| JP | 4448708-82 | ‡ | 4/2010 | |

(Continued)

*Primary Examiner* — Kevin Quarterman
(74) *Attorney, Agent, or Firm* — Sughrue Mion, PLLC

(57) ABSTRACT

Provided are an illumination device and an electronic apparatus. The illumination device includes a light source configured to emit light, a surface light source layer configured to convert the light emitted from the light source to surface light, a focusing lens configured to focus the surface light from the surface light source layer, and a display panel including an aperture through which light focused by the focusing lens passes.

16 Claims, 18 Drawing Sheets

(56) References Cited

U.S. PATENT DOCUMENTS

2018/0195693 A1‡ 7/2018 Yanagisawa ............ F21V 5/004
2019/0137665 A1‡ 5/2019 You ...................... G02B 27/425

FOREIGN PATENT DOCUMENTS

| JP | 4448708 B2 | 4/2010 | |
|----|----|----|----|
| JP | 4566226 B2 ‡ | 10/2010 | ........... G02B 6/0038 |
| JP | 4566226 B2 | 10/2010 | |
| KR | 10-1649579 B1 ‡ | 8/2016 | |
| KR | 10-1649579 B1 | 8/2016 | |
| KR | 10-2019-0052544 A ‡ | 5/2019 | |
| KR | 10-2019-0052544 A | 5/2019 | |

‡ imported from a related application

ILLUMINATION DEVICE AND ELECTRONIC APPARATUS INCLUDING THE SAME

CROSS-REFERENCE TO RELATED APPLICATIONS

This application is a Continuation Application of U.S. application Ser. No. 16/577,621 filed on Sep. 20, 2019 in the U.S. Patent and Trademark Office, which claims the benefit of U.S. Provisional Application No. 62/733,840, filed on Sep. 20, 2018, in the U.S. Patent and Trademark Office, and priority to Korean Patent Application No. 10-2019-0082826, filed on Jul. 9, 2019, in the Korean Intellectual Property Office, the disclosures of which are incorporated herein in their entireties by reference.

BACKGROUND

1. Field

Example embodiments of the present disclosure relate to an illumination device and an electronic apparatus including the same.

2. Description of the Related Art

Recently, in the recognition of objects such as humans and other objects, it is increasingly necessary to accurately identify the shape, position, and motion of an object by accurate three-dimensional shape recognition. For example, there is a demand for various sensors such as an iris recognition sensor, a face sensor, or a depth sensor in mobile and wearable devices, and an illumination device including multiple light sources and optical parts is provided together in an electronic apparatus. A laser is often used for a sensor for three-dimensional image recognition.

Furthermore, recent displays for smartphones have bezel-less screens with a full screen display, and it may be difficult to appropriately arrange an illumination device on the front surface as most of the front surface of a device is used as a display surface.

SUMMARY

One or more example embodiments provide an illumination device disposed at a rear surface of a display.

One or more example embodiments also provide an electronic apparatus including an illumination device that is disposed at a rear surface of a display.

Additional aspects will be set forth in part in the description which follows and, in part, will be apparent from the description, or may be learned by practice of example embodiments of the disclosure.

According to an aspect of an example embodiment, there is provided an illumination device including a light source configured to emit light, a surface light source layer configured to convert the light emitted from the light source to surface light, a focusing lens configured to focus the surface light from the surface light source layer, and a display panel including an aperture through which light focused by the focusing lens passes.

The surface light source layer may be disposed at a focal length of the focusing lens from the focusing lens.

The surface light source layer may include a mask having a pattern configured to form structured light.

The mask may include materials having different transmittances which are respectively configured to transmit the light emitted from the light source or block the light emitted from the light source.

The surface light source layer may include a diffuser.

The diffuser may include a microlens array, a metalens array, or a random optical structure.

The light source may include a plurality of light-emitting elements, and the microlens array or the metalens array may have a size that is equal to or less than a pitch of each of the plurality of light-emitting elements.

The random optical structure may include grains, and each of the grains has an average size that is equal to or less than twice a wavelength of the light emitted from the light source.

The random optical structure may include a meta-surface having a transmission phase.

The aperture may have a diameter of 0.5 mm or less.

The focusing lens may include a refraction lens, a Fresnel lens, or a metalens.

The metalens may include a plurality of nano-structures, and each of the plurality of nano-structures may have a pitch of ½ of a wavelength of the light emitted from the light source or less and a height of ¾ of the wavelength of the light emitted from the light source or less.

The nano-structure may have a refractive index that is greater, by 0.5 or more, than a refractive index of a surrounding material.

The aperture may be provided corresponding to an area of 20×20 pixels or less with respect to pixels included in the display panel.

The focusing lens may include a plurality of nano-structures, each of the plurality of nano-structures having a shape dimension of a subwavelength that is less than a wavelength of the light emitted from the light source.

The illumination device may further include a heat sink disposed on a rear side of the light source opposite to the surface light source layer.

According to another aspect of an example embodiment, there is provided an electronic apparatus including an illumination device configured to emit light to an object, a sensor configured to receive light reflected from the object, and a processor configured to acquire information about the object based on the light received by the sensor, wherein the illumination device includes a light source, a surface light source layer configured to convert light emitted from the light source to surface light, a focusing lens configured to focus the surface light from the surface light source layer, and an aperture through which light focused by the focusing lens passes.

BRIEF DESCRIPTION OF THE DRAWINGS

The above and other aspects, features, and advantages of example embodiments will be more apparent from the following description taken in conjunction with the accompanying drawings, in which.

DETAILED DESCRIPTION

Figure 1:
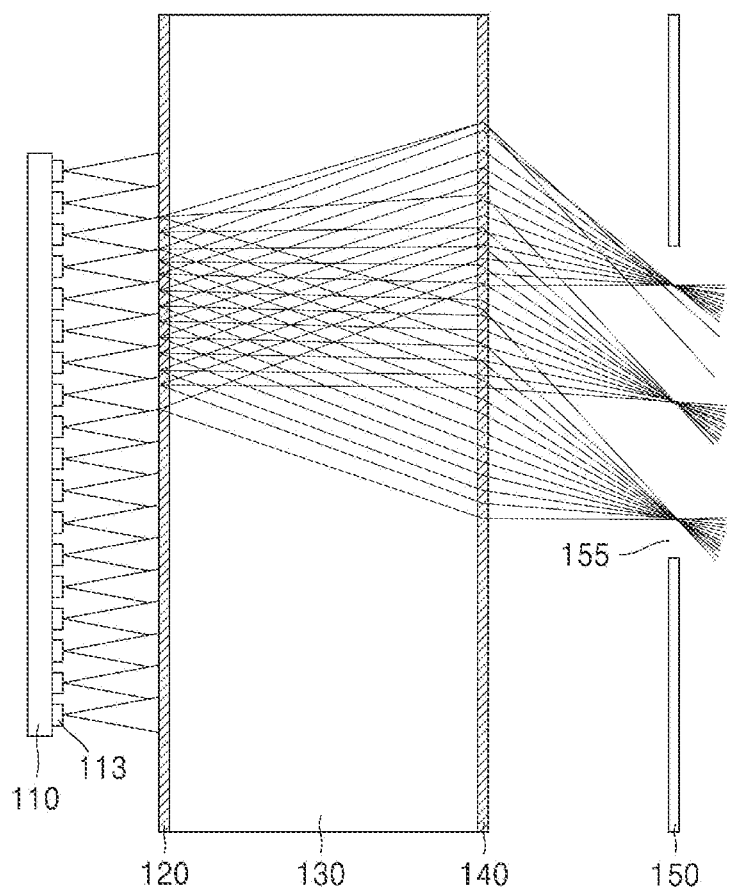
FIG. 1 illustrates an illumination device according to an example embodiment.

Example embodiments will now be described in detail with reference to the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

An illumination device according to an example embodiment and an electronic apparatus including the illumination device are described in detail with reference to the accompanying drawings. Also, the size of each layer illustrated in the drawings may be exaggerated for convenience of explanation and clarity. Terms such as "first" and "second" are used herein merely to describe a variety of constituent elements, but the constituent elements are not limited by the terms. Such terms are used only for the purpose of distinguishing one constituent element from another constituent element.

Throughout the specification, when a portion "includes" an element, another element may be further included, rather than excluding the existence of the other element, unless otherwise described. Also, throughout the specification, "on" refers to a top or bottom of a target, and does not necessarily mean the top of the target based on a direction of gravity. Also, in the following description, when a material layer is described to exist on another layer, the material layer may exist directly on the other layer or a third layer may be interposed therebetween. Since a material forming each layer in the following embodiments is exemplary, other materials may be used therefor.

Terms such as a "portion", a "unit", a "module", and a "block" stated in the specification may signify a unit to process at least one function or operation and the unit may be embodied by hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of terms "a" and "an" and "the" and similar referents in the context of describing the disclosure are to be construed to cover both the singular and the plural.

The steps of all methods described herein can be performed in any suitable order unless otherwise indicated herein or otherwise clearly contradicted by context. The use of any and all examples, or language (e.g., "such as") provided herein, is intended merely to better illuminate the disclosure and does not pose a limitation on the scope of the disclosure unless otherwise claimed.

FIG. 1 schematically illustrates an illumination device according to an example embodiment.

The illumination device may include a light source 110, a surface light source layer 120 that converts light emitted from the light source 110 to surface light, and a focusing lens 140 that focuses the light emitted from the surface light source layer 120. The focusing lens 140 may be configured to focus the light and have the focused light pass through an aperture 155 provided in a display panel 150 that forms an image. A transparent layer 130 may be further provided between the surface light source layer 120 and the focusing lens 140. The transparent layer 130 may support the surface light source layer 120 and the focusing lens 140 and simultaneously transfer the light that passed through the surface light source layer 120 to the focusing lens 140.

The light source 110 may include an array of a plurality of light-emitting elements 113. The light-emitting elements 113 may include light emitting diodes (LEDs) or laser diodes that emit laser light. The light-emitting elements 113 may include, for example, a vertical cavity surface emitting laser (VCSEL). The light-emitting elements 113 may include, for example, Group III-V semiconductor materials or Group II-VI semiconductor materials and may include an active layer having a multi-quantum well structure, but embodiments are not limited thereto. The light-emitting elements 113, when applied to a three-dimensional shape recognition sensor, may emit laser light of about 850 nm or about 940 nm, or light in a near-infrared or visible light wavelength range. The wavelength of the light emitted from the light-emitting elements 113 is not particularly limited and light in a desired wavelength range may be variously emitted.

The surface light source layer 120 may include, for example, a mask having a specific pattern. Patterned light may be formed by using a mask, and thus, structured light may be formed. The mask may be an amplitude mask including materials having different transmittances so as to transmit or block light based on the materials.

Figure 2:
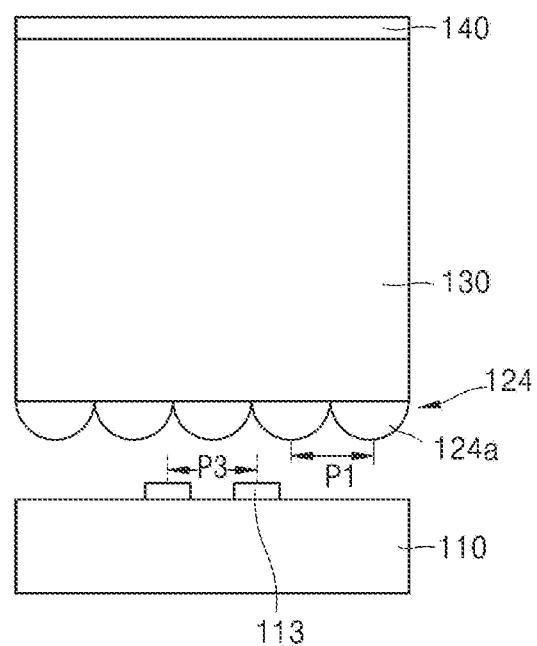
FIG. 2 illustrates a microlens array employed as a diffuser of an illumination device according to an example embodiment.
Figure 3:
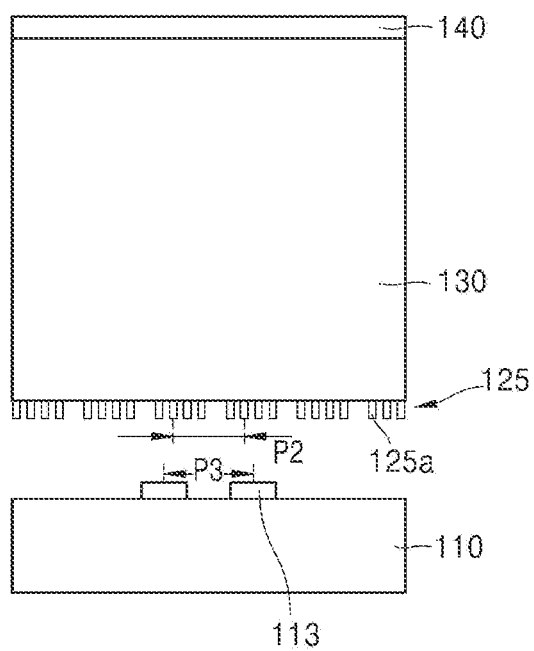
FIG. 3 illustrates a metalens array employed as a diffuser of an illumination device according to an example embodiment.
Figure 4:
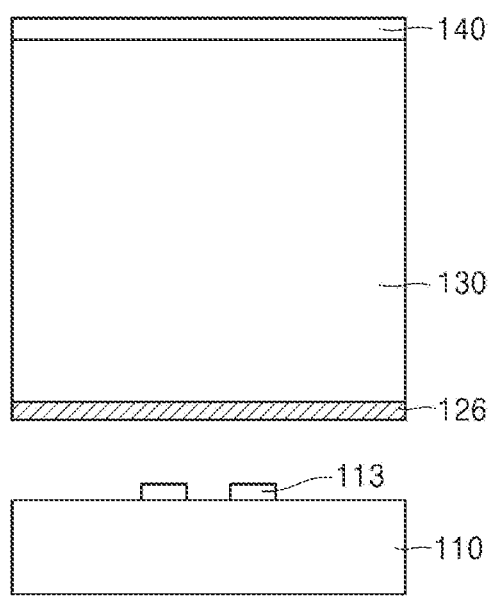
FIG. 4 illustrates a random optical structure employed as an illumination device according to an example embodiment.

The surface light source layer 120 may include a diffuser. FIGS. 2 to 4 illustrate examples of a diffuser. The diffuser may include, for example, a microlens array 124 as illustrated in FIG. 2. The microlens array 124 may include an array of microlenses 124a. Referring to FIG. 3, the diffuser may include a metalens array 125. The metalens array 125 may include a plurality of nano-structures 125a, each of the nano-structures 125a having the shape dimension of a subwavelength. The shape dimension of a subwavelength may indicate that the thickness or width that is a dimension to define the shape of the nano-structures 125a is less than the wavelength of the light emitted from the light source 110, for example, a ½ wavelength.

The nano-structures 125 may include a material having a higher refractive index than a surrounding material, for example, air, and may diffuse light of a certain wavelength range on the basis of the shape dimension of a subwavelength, a specific shape, or an arrangement form. The nano-structures 125a may have a type of a meta-substructure. Any one of a height, a width, and an arrangement interval, that is, a pitch, of the nano-structures 125a may have a meta-substructure when it is equal to or less than ½ of the wavelength of light. For example, when the width of the nano-structures 125a is equal to or less than ½ of the wavelength of light, the nano-structures 125a may operate in units of scattering, and as the arrangement interval becomes less than the wavelength, the light input without high-order diffraction may be controlled to a desired form. However, the width of the nano-structures 125a is not limited thereto.

The nano-structures 125a may include a dielectric or a semiconductor material. For example, the nano-structures 125a may include any one material of single crystal silicon (Si), poly-crystalline Si, amorphous Si, silicon nitride ($Si_3N_4$), gallium phosphide (GaP), titanium dioxide ($TiO_2$), aluminum antimonide (AlSb), aluminum arsenide (AlAs), aluminum gallium arsenide (AlGaAs), aluminum gallium phosphide (AlGaInP), boron phosphide (BP), and zinc germanium diphosphide ($ZnGeP_2$). The nano-structures 125a may include a conductive material. The conductive material may include a metal material having a relatively high conductivity that may cause surface plasmon excitation. For example, the conductive material may include any one material selected from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), and may include an alloy including any one thereof. Furthermore, a two-dimensional material having superior conductivity, such as graphene, or a conductive oxide, may be employed as the conductive material. Some of the nano-structures 125a may include a dielectric material having a high refractive index, and others thereof may include a conductive material.

FIG. 4 illustrates an example in which the diffuser includes a random optical structure 126. The random optical structure 126 may have a structure in which grains are randomly arranged. A grain may have, for example, an average size that is equal to or less than twice the wavelength of the light emitted from the light source 110. The random optical structure 126 may include a meta-surface having a random transmission phase.

When the surface light source layer 120 includes a diffuser, the diffuser may allow the light emitted from the light source 110 to be transferred to an object as flood illumination.

When the diffuser includes the microlens array 124 or the metalens array 125, an arrangement pitch P1 of the microlenses 124a or an arrangement pitch P2 of the nano-structures 125a may be equal to or less than an arrangement pitch P3 of the light-emitting elements 113 of the light source 110. The arrangement pitch P2 of the nano-structures 125a, when the nano-structures 125a are periodically repeated, may indicate a periodical arrangement interval. The nano-structures 125a may have the same size or a different size in one arrangement period.

Figure 5:
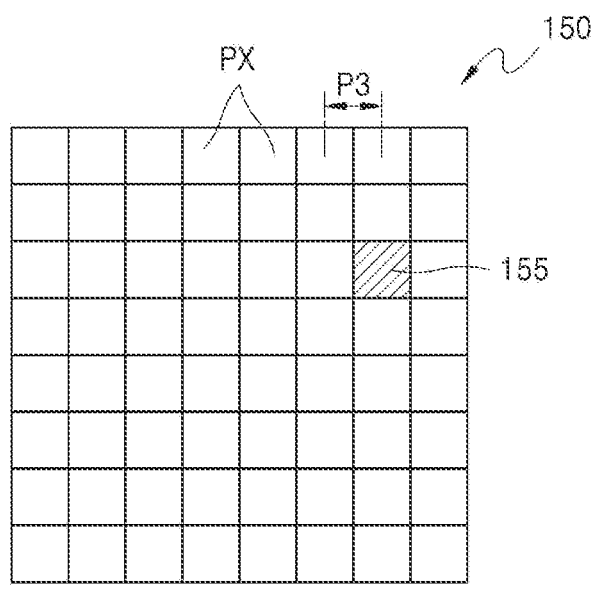
FIG. 5 illustrates a display panel of an illumination device according to an example embodiment.

The display panel 150 may form and display an image. Referring to FIG. 5, the display panel 150 may include a plurality of pixels PX. The display panel 150 may include at least one aperture 155. The aperture 155 may pass the light emitted from the light source 110, as it is. The aperture 155 may be provided, for example, in one pixel PX. However, embodiments are not limited thereto, and the aperture 155 may be provided in a certain number of pixels. For example, the aperture 155 may be provided in an area of 20×20 pixels or less. The aperture 155 may have a size that is not recognizable by the human eyes.

The display panel 150 may include, for example, a display element such as an organic LED (OLED). For example, the aperture 155 may be an area obtained by removing a part of common electrode layer of a display such as an OLED. A display element is sectioned into a plurality of regions that are controlled to be electrically turned on/off according to image information, and such a region may be referred to as a pixel PX. The display panel 150 may include the display element and circuit elements to control the same and may be an opaque area due to a metal material included therein. The light input to the pixel PX from the light source 110 under the display panel 150 is not output to the front surface of the display panel 150. The aperture 155 is an area for transmitting the light emitted from the light source 110. Accordingly, the light input to the aperture 155 may exit through the front surface of the display panel 150.

In FIG. 5, P3 denotes a pitch of the pixel PX of the display panel 150.

The surface light source layer 120 may radiate light at uniform brightness by diffusing the light. For example, a diffusion angle of the light that passed through the surface light source layer 120 may be 10° to 30°. However, embodiments are not limited thereto, and the diffusion angle of the light that passed through the surface light source layer 120 may be greater than 60°. The surface light source layer 120 may be disposed at the focal length of the focusing lens 140 from the focusing lens 140.

The focusing lens 140 may make the diffused light emitted from the surface light source layer 120 parallel or focused so as to be appropriately deflected to pass through the aperture 155 of the display panel 150. As the light is deflected most when passing through the focusing lens 140, the angle of the light passing through the aperture 155 may determine the field of view of a projector. The focusing lens 140 may reduce the size of light. Accordingly, as the light is focused by the focusing lens 140, even when the size of the aperture 155 is reduced, the light may pass through the aperture 155. For example, the aperture 155 may have a diameter of about 0.5 mm or less. The aperture 155 may have a diameter of 0.4 mm or less. The focusing lens 140 may include, for example, a refraction lens, a Fresnel lens, or a metalens.

Figure 6:
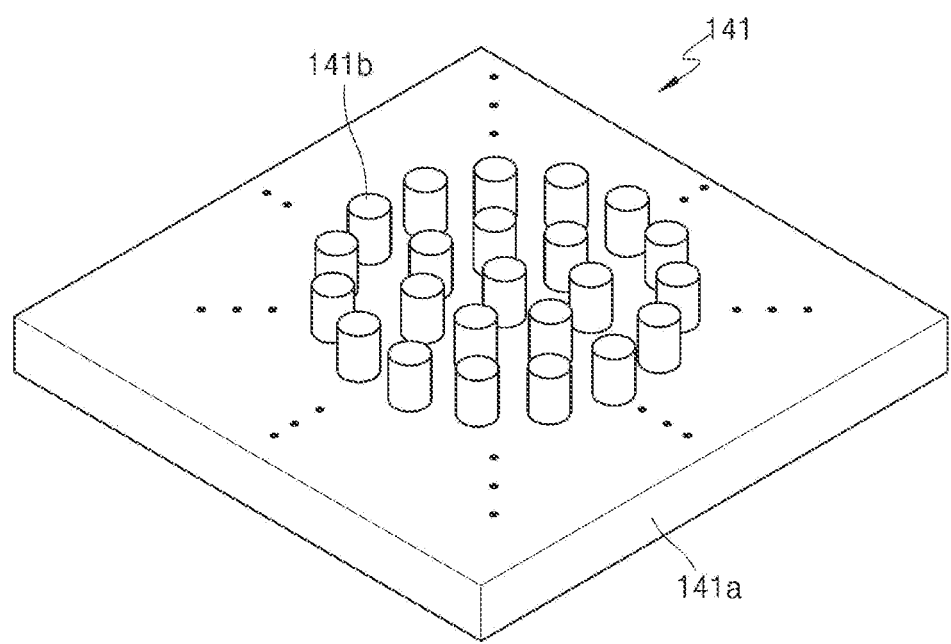
FIGS. 6 to 14 illustrate various examples of a nanostructure of a meta-surface layer of a light-emitting light source array device of an illumination device according to example embodiments.

FIG. 6 is a perspective view illustrating an example of a metalens.

Referring to FIG. 6, a metalens 141 may include a support layer 141a and a plurality of nano-structures 141b provided on the support layer 141a. The support layer 141a may be replaced with the transparent layer 130 illustrated in FIG. 1 or may be provided separately from the transparent layer 130. The nano-structures 141b may have various shapes such as a cylindrical pillar, an elliptical pillar, or a rectangular pillar. FIG. 6 illustrates an example in which the nano-structures 141b have a cylindrical pillar shape. The nano-structures 141b may include a material having a higher refractive index than the surrounding material, for example, air, and may include the shape dimension of a subwavelength, a specific shape, or an arrangement form. The nano-structures 141b may have a type of a meta-substructure. At least one of the height, the width, and the arrangement interval, that is, the pitch, of the nano-structures 141b may have a size equal to or less than ½ of the wavelength of light. For example, when the width of the nano-structures 141b is equal to or less than ½ of the wavelength of light, the nano-structures 141b may operate in units of scattering, and as the arrangement interval becomes less than the wavelength, the light input without high-order diffraction may be controlled to a desired form. However, the width of the nano-structures 141b is not limited thereto. In addition, the height of the nano-structures 141b may be equal to or less than ¾ of the wavelength of light emitted from the light source 110.

The nano-structures 141b may include a dielectric or a semiconductor material. For example, the nano-structures 141b may include any one material of single crystal silicon, poly-crystalline Si, amorphous Si, $Si_3N_4$, GaP, $TiO_2$, AlSb, AlAs, AlGaAs, AlGaInP, BP, and $ZnGeP_2$. The nano-structures 141b may include a conductive material. The conductive material may include a metal material having high conductivity that may cause surface plasmon excitation. For example, the conductive material may include any one material selected from among Cu, Al, Ni, Fe, Co, Zn, Ti, Ru, Rh, Pd, Pt, Ag, Os, Ir, and Au, and may include an alloy including any one thereof. Furthermore, a two-dimensional material having superior conductivity, such as graphene, or a conductive oxide, may be employed as the conductive material. Some of the nano-structures 141b may include a dielectric material having a high refractive index, and others thereof may include a conductive material. The nano-structures 141b may have, for example, a refractive index that is greater, by about 0.5 or more, than a refractive index of the surrounding material.

Figure 7:
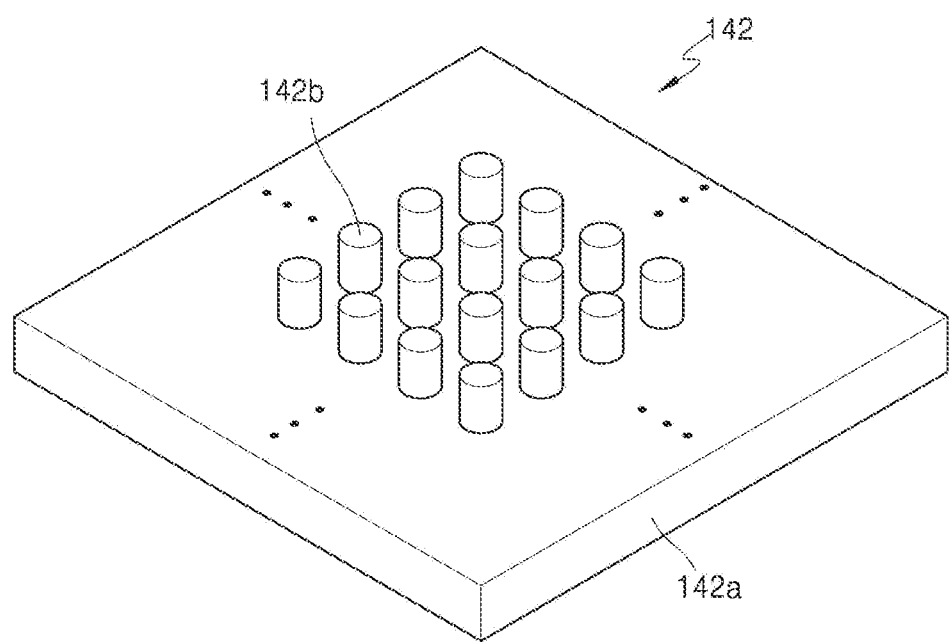

FIG. 7 is a cross-sectional view of an example of a metalens.

Referring to FIG. 7, a metalens 142 may include a support layer 142a and a plurality of nano-structures 142b provided on the support layer 142a. In FIG. 7, an example in which the nano-structures 142b are arranged in the form of a rectangular lattice is illustrated. In addition, the nano-structures 142b may be arranged in the form of a hexagonal lattice, and the arrangement form may be changed in various ways.

Figure 8:
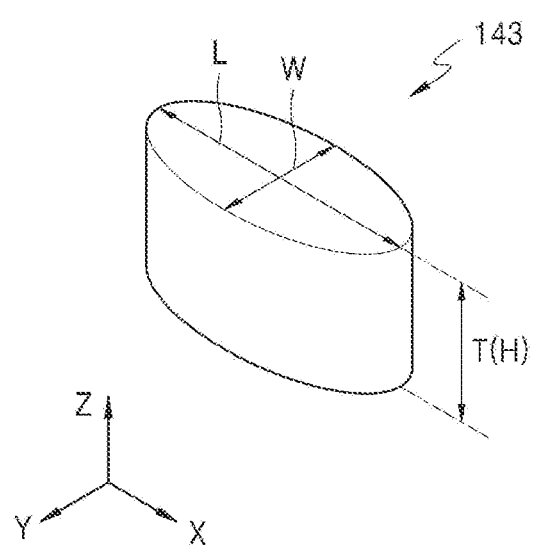

FIG. 8 is a perspective view illustrating a structure of a nano-structure applicable to an example of a metalens.

Referring to FIG. 8, a nano-structure 143 may have, on an X-Y plane, a major axis in a first direction, for example, an X-axis direction, and a minor axis in a second direction, for example, a Y-axis direction. A dimension in a major-axis direction may be referred to as a length L, and a dimension in a minor-axis direction may be referred to as a width W. A dimension in a Z-axis direction may be referred to as a thickness T or a height H. The length L may be greater than the width W, and on the X-Y plane, the nano-structure 143 may have an oval or a similar shape thereto. The nano-structure 143 may have an anisotropic structure.

The width W, the length L, and/or the thickness T of the nano-structure 143 may be equal to or less than ½ of the wavelength of the light emitted from the light source 110. Furthermore, when the nano-structure 143 is regularly arranged, an interval between two neighboring nano-structures 143, that is, an interval between the centers thereof, may be equal to or less than ½ of the wavelength of light.

The anisotropic structure of a nano-structure may be changed in various ways. For example, on the X-Y plane, a nano-structure may have an anisotropic structure of another shape than an oval shape. Examples thereof are illustrated in FIGS. 9 and 10.

Figure 9:
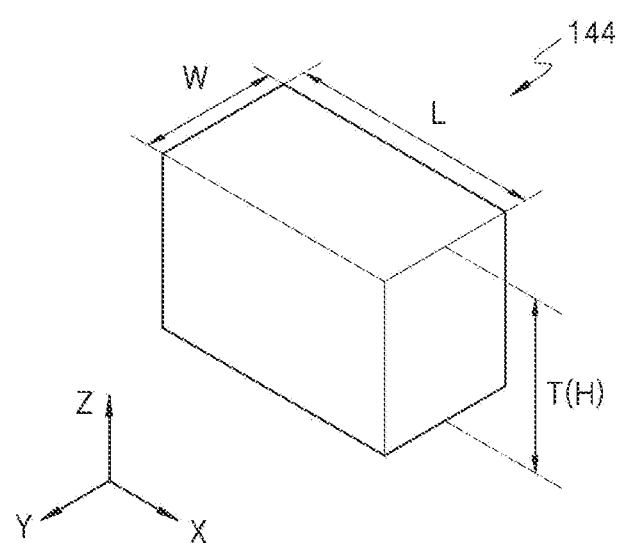

Referring to FIG. 9, a nano-structure 144 may have a rectangular pillar shape. The nano-structure 144 may have an anisotropic structure of a rectangular shape on the X-Y plane.

Figure 10:
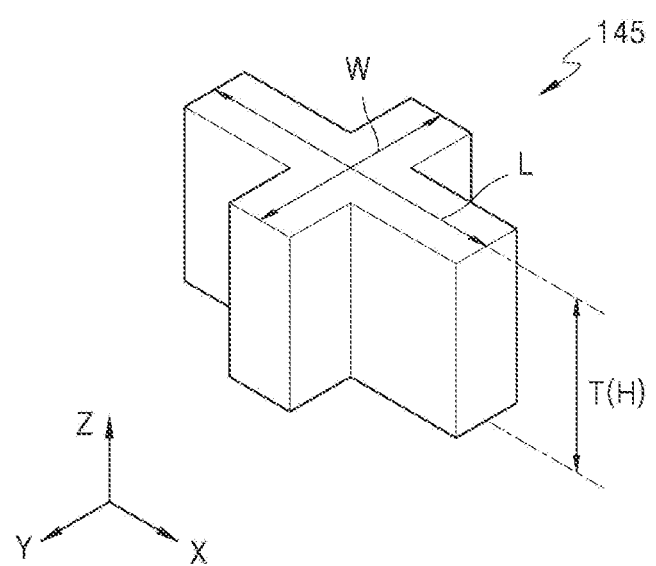

Referring to FIG. 10, a nano-structure 145 may have a cross pillar shape. The length L of the nano-structure 145 in the X-axis direction may be greater than the width W of the nano-structure 145 in the Y-axis direction. Accordingly, the nano-structure 145 may have an anisotropic structure.

As described above with reference to FIGS. 8 to 10, when the nano-structures 143, 144, and 145 have an anisotropic structure, the polarization direction of light (exit light) may be controlled by using an array thereof. By arranging the nano-structures 143, 144, and 145 having an anisotropic structure to have a particular direction and a change distribution of a direction, the light (exit light) may be controlled to have a particular polarization direction. However, the structures of the nano-structures 143, 144, and 145 are exemplary and may be changed in various ways.

According to example embodiments, the metalens may be designed to be used as a metalens, a meta-prism, or a meta-diffraction element. The size distribution and arrangement rule of a plurality of nano-structures forming the metalens may be designed so that the metalens may operate as a concave lens or a convex lens, a prism, or a diffraction element.

Figure 11:
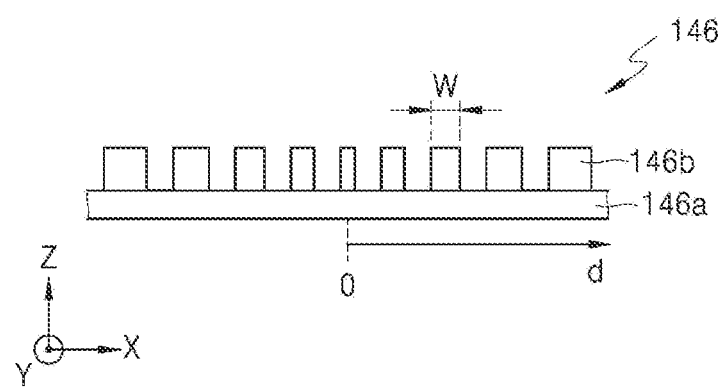

FIG. 11 is a cross-sectional view illustrating a nano-structure of an example of a metalens.

Referring to FIG. 11, a metalens 146 may include a support layer 146a and a plurality of nano-structures 146b formed on the support layer 146a. The size distribution and arrangement rule of the nano-structures 146b may be set so that the metalens 146 may serve as a convex lens. For example, the width W of each of the nano-structures 146b may increase away from the center of the metalens 146 by a separation distance d. When the position of one of the nano-structures 146b is defined by a separation distance d from the center of the metalens 146, the width W of one of the nano-structures 146b at a given position may be set to a specific value so that the metalens 146 may operate as a convex lens. For example, the width W of each of the nano-structures 146b may increase away from the center of the metalens 146.

Figure 12:
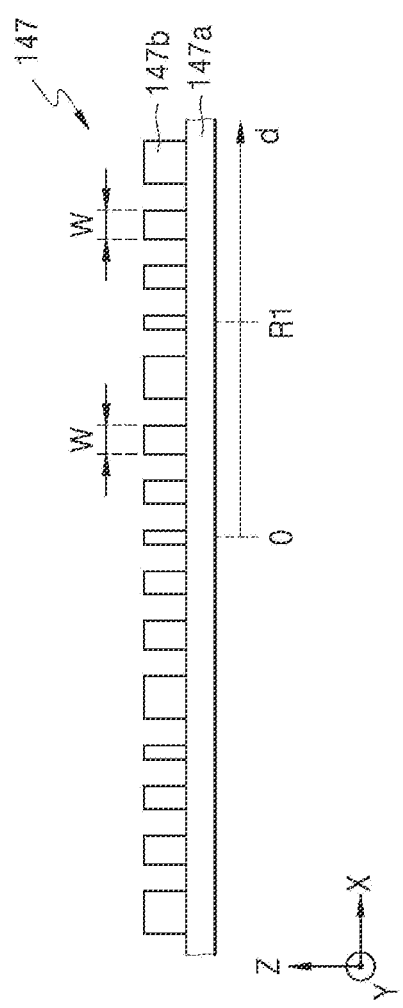

In another example, the change rule of the width W of each of the nano-structures 146b may be repeated as illustrated in FIG. 12.

Referring to FIG. 12, a metalens 147 may include a support layer 147a and a plurality of nano-structures 147b, and the width W of each of the nano-structures 147b may increase away from the center of the metalens 147 according to a certain rule. The metalens 147 may be sectioned into a plurality of regions according to a distance in a direction away from the center O, and in each of the regions, the width W of each of the nano-structures 147b may increase away from the center O. A case is illustrated in which the width W increases from the center (d=0) to a position R1 and the width W increases again as the distance d increases from the position R1. A cycle of repeating the rule of increasing the width W may not be constant and may be changed. The metalens 147 may operate as a convex lens.

When the metalens 146 or 147 operates as a convex lens, the intensity of the light emitted from the light source 110 may be reinforced and a wave front profile may be controlled. The optical properties of the metalenses 146 and 147 may be controlled by adjusting the size distribution and arrangement rule of a plurality of nano-structures constituting the metalens 146 or 147, and consequently, beam forming and beam shaping of exit light may be possible.

Figure 13:
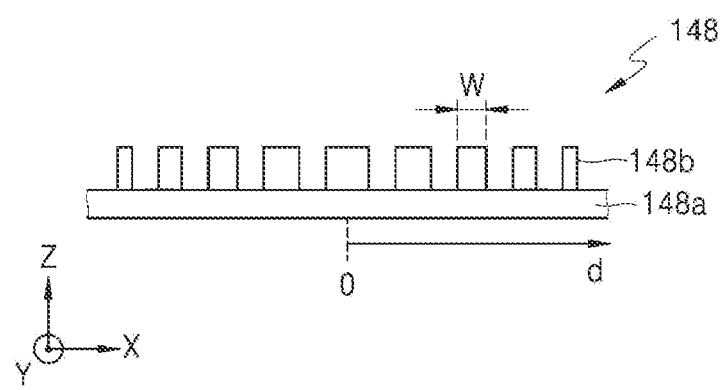

FIG. 13 illustrates a structure of an example of a metalens.

Referring to FIG. 13, a metalens 148 may include a support layer 148a and a plurality of nano-structures 148b formed on the support layer 148a. The size distribution and arrangement rule of the nano-structures 148b may be set so that the metalens 148 may serve as a concave lens. For example, the width W of each of the nano-structures 148b may decrease away from the center of the metalens 148 by a certain distance d. The width W of the nano-structures 148b may decrease away from the center O.

Figure 14:
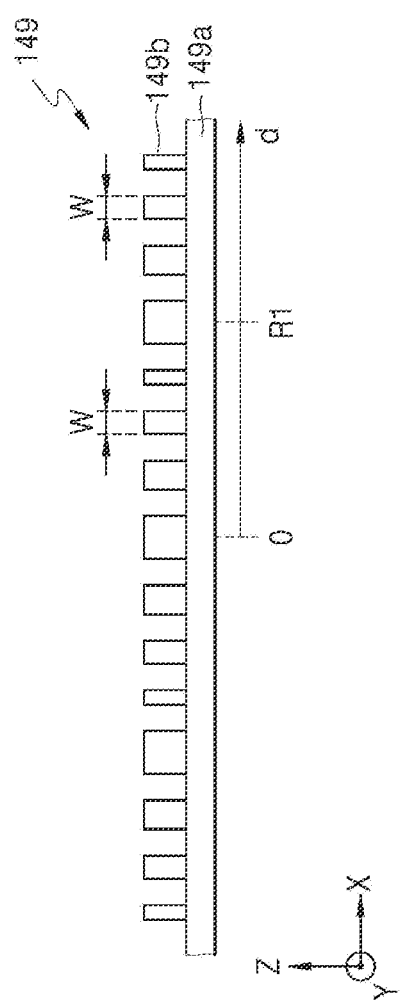

The change rule of the width W of the nano-structures 148b described in FIG. 13 may be repeated as illustrated in FIG. 14.

Referring to FIG. 14, a metalens 149 may include a support layer 149a and a plurality of nano-structures 149b, and the width W of the nano-structures 149b may decrease away from the center O of the metalens 149 according to a certain rule. The metalens 149 may be sectioned into a plurality of regions according to a distance in a direction away from the center O, and in each of the regions, the width W of the nano-structures 149b may decrease away from the center O. A cycle of repeating the rule of decreasing the width W of the nano-structures 149b may not be constant and may be changed. The metalens 149 may operate as a convex lens.

In a metalens, the dimension and arrangement of a plurality of nano-structures may be determined so as to perform a function of deflecting exit light. The arrangement rule and size distribution may be determined so that the width or size of a plurality of nano-structures gradually decreases or increases in one direction, for example, a horizontal direction. Furthermore, the above corresponding arrangement, which is one cyclic unit, may be repeated in a horizontal direction. The metalens may be variously adjusted so as to control optical performance such as a beam diameter, a converging/diverging shape, or a direction of exit light, and also to control a polarization direction of exit light.

Figure 15:
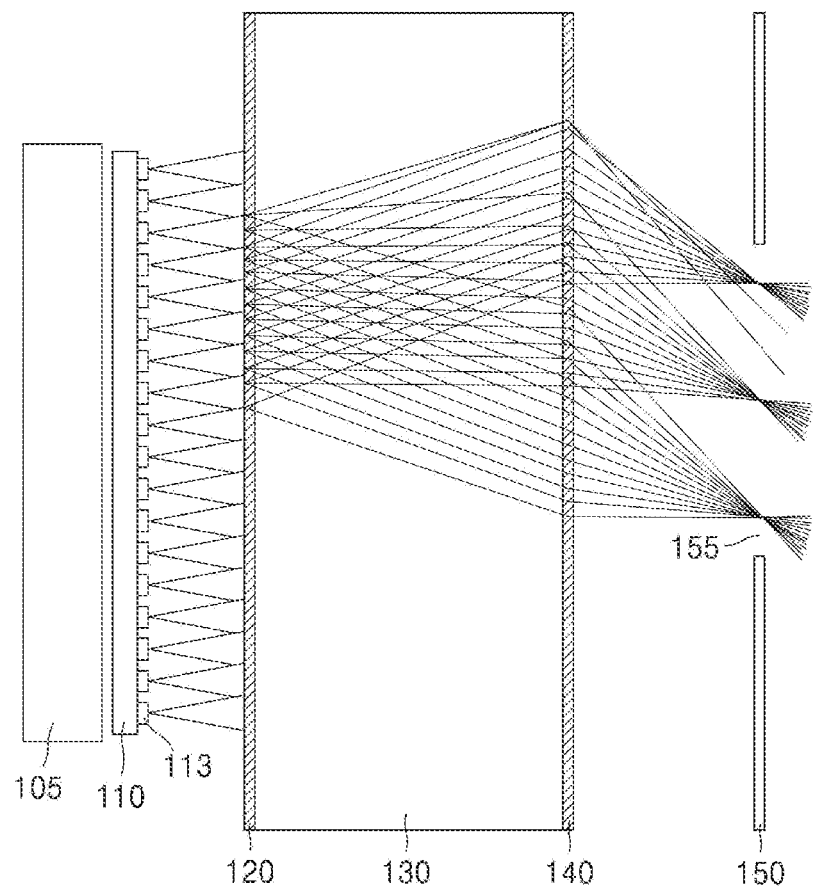
FIG. 15 illustrates an example in which the illumination device illustrated in FIG. 1 further includes a heat sink.

FIG. 15 illustrates an example in which a heat sink is further provided in the illumination device illustrated in FIG. 1. A heat sink 105 may be further provided at the rear side of the light source 110 to dissipate heat generated by the light source 110. As heat is effectively dissipated through the heat sink 105, a malfunction occurrence rate of an illumination device may be reduced and light may be extended.

Figure 16:
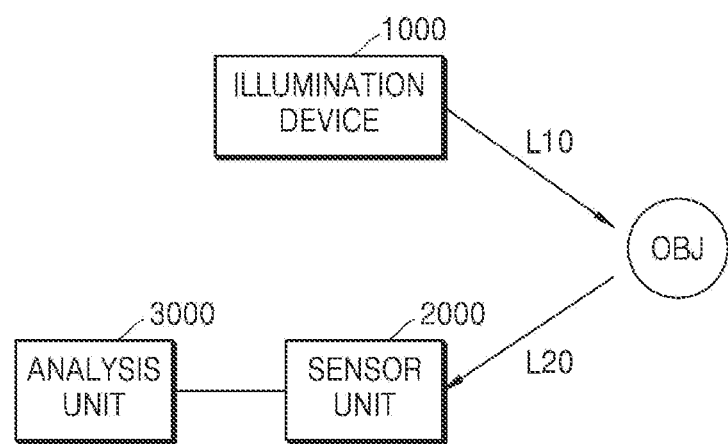
FIG. 16 is a block diagram of an electronic apparatus according to an example embodiment.

FIG. 16 is a block diagram illustrating a structure of an electronic apparatus (optical apparatus) according to an example embodiment.

Referring to FIG. 16, an electronic apparatus (optical apparatus) according to an example embodiment may include an illumination device 1000 for radiating light L10 toward an object OBJ and a sensor unit 2000 for detecting light L20, which is emitted from the illumination device 100 and modulated (reflected) by the object OBJ. The example embodiments described with reference to FIGS. 1 to 15 may be applied to the illumination device 1000. Furthermore, the electronic apparatus may further include an analysis unit 3000 for analyzing at least one of physical properties, a shape, a position, or an operation of the object OBJ by analyzing the light detected by the sensor unit 2000.

Optical elements configured to perform additional functions of adjusting the direction of light generated from the illumination device 1000 toward the object OBJ, adjusting the size of light, or modulating light to patterned light may be further provided between the illumination device 1000 and the object OBJ. When the surface light source layer 120 (see FIG. 1) provided in the illumination device 1000 is designed to be suitable for performing such a function, the optical element may be omitted. The sensor unit 2000 senses the light L20, which is modulated (reflected) by the object OBJ. The sensor unit 2000 may include an array of light detection elements. The sensor unit 2000 may further include a spectrum element for analyzing the light L20 modulated (reflected) by the object OBJ according to the wavelengths thereof.

The analysis unit 3000 may analyze at least one of the physical properties, a shape, a position, or an operation of the object OBJ by analyzing the light received by the sensor unit 2000. By comparing a pattern of the light L10 irradiated to the object OBJ to a pattern of the light L20 reflected by the object OBJ, the three-dimensional shape, a position, or a movement of the object OBJ may be analyzed, or the physical properties of the object OBJ may be analyzed by analyzing the wavelength of the light excited in the object OBJ by incident light, that is, L10.

The electronic apparatus (optical apparatus) according to the example embodiment may further include a controller for controlling the driving of the illumination device 1000 or the operation of the sensor unit 2000, and furthermore, may further include a memory for storing an operation program to extract three-dimensional information, which is performed by the analysis unit 3000. The operation result of the analysis unit 3000, that is, information about the shape, position, or physical properties of the object OBJ, may be transmitted to another unit. For example, the information may be transmitted to another controller of a device employing an electronic apparatus.

The electronic apparatus (optical apparatus) according to the example embodiment may be used as a sensor for more precisely obtaining three-dimensional information regarding a front object, thereby being employed in various devices. Such a device may include, for example, autonomous driving devices such as an unmanned vehicle, an autonomous vehicle, a robot, or a drone, and in addition, may include an augmented reality device, a mobile communication device, or an internet of thing (IOT) device.

The structure of the electronic apparatus (optical apparatus) described with reference to FIG. 16 is an example, and the illumination device according to an embodiment may be applied to various electronic apparatuses (optical apparatuses). The illumination device may be applied to various fields such as imaging devices, projectors, scanners, or sensors.

The illumination devices according to the above-described embodiments may be employed to various electronic apparatuses using a concept in which an illumination device is disposed at the rear surface of a display panel and illuminates an object through the display panel.

Figure 17:
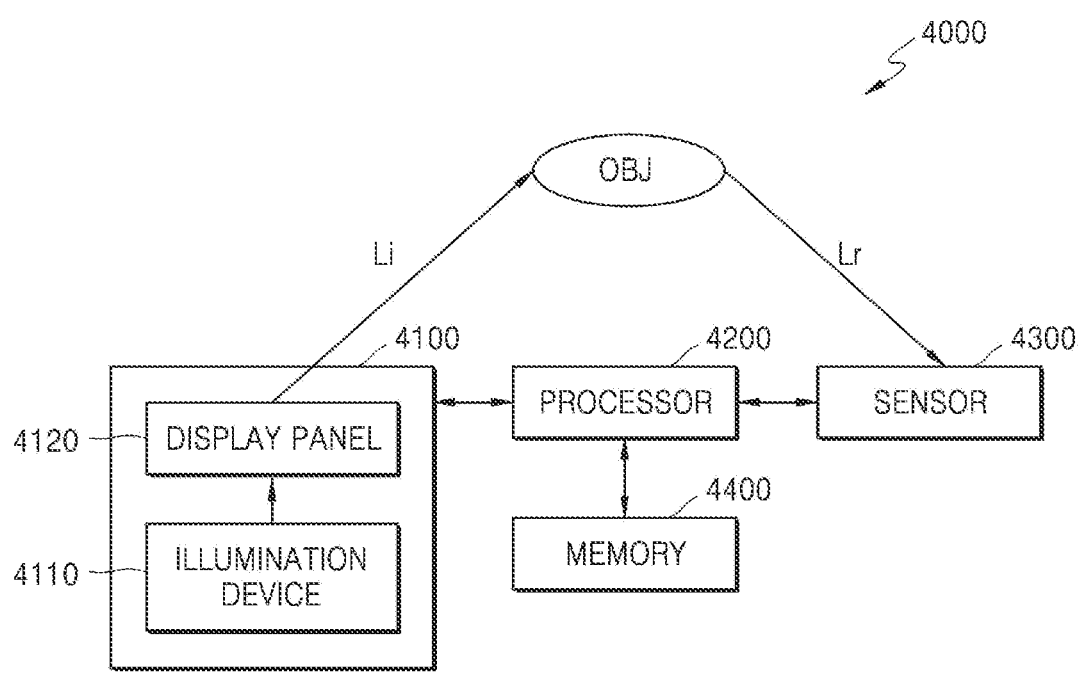
FIG. 17 is a block diagram of an electronic apparatus according to an example embodiment.

FIG. 17 is a block diagram illustrating a structure of an electronic apparatus according to an example embodiment.

An electronic apparatus 4000 may include a display 4100 for radiating light Li toward the object OBJ, a sensor 4300 for receiving light Lr reflected from the object OBJ, and a processor 4200 for performing an operation to acquire information about the object OBJ from the light received by the sensor 4300. The display 4100 may include an illumination device 4110 for radiating light and a display panel 4120 for displaying an image.

The electronic apparatus 4000 may also include a memory 4400 for storing code or data for execution by the processor 4200.

Light L emitted from the illumination device 4110 may illuminate the object OBJ through an aperture 155 (see FIG. 1) of the display panel 4120.

The illumination device 4110 may illuminate or scan the object OBJ with structured light. The sensor 4300 senses the light Lr reflected by the object OBJ. The sensor 4300 may further include a spectrum device to analyze the light reflected from the object OBJ according to the wavelengths thereof.

The processor 4200 may perform an operation to acquire information about the object OBJ from the light received by the sensor 4300 and may further perform the overall process and control of the electronic apparatus 4000. The processor 4200 may acquire and process information about the object OBJ, for example, two-dimensional or three-dimensional image information, and may generally control the driving of the illumination device 4110 or the operation of the sensor 4300. The processor 4200 may also determine whether use authentication has been made on the basis of the information acquired from the object OBJ, or applications may be executed therefor.

The memory 4400 may store code for execution by the processor 4200, and in addition, various execution modules executed by the electronic apparatus 4000 or data therefor may be stored therein. For example, program code to be used by the processor 4200 for an operation to acquire information about the object OBJ may be stored in the memory 4400, or code of an application module, which may be executed by using the information about the object OBJ, may be stored in the memory 4400. Furthermore, the electronic apparatus 4000 may further include a communication module, a camera module, a motion picture reproducing module, or an audio reproducing module.

A result of the operation in the processor 4200, that is, information about the shape and position of the object OBJ, may be transmitted to another device or unit, as necessary. For example, the information about the object OBJ may be transmitted to a controller of other electronic apparatus which uses the information about the object OBJ. The other unit to which the result is transmitted may include a display device or printer that outputs the result. In addition, the electronic apparatus may include smart phones, mobile phones, personal digital assistants (PDAs), laptops, PCs, various wearable devices, and other mobile or non-mobile computing devices, but embodiments are not limited thereto.

The memory 4400 may include at least one type of a storage medium such as a flash memory type, a hard disk type, a multimedia card micro type, a card type memory, for example, SD or XD memory, random access memory (RAM), static RAM (SRAM), read-only memory (ROM), electrically erasable programmable ROM (EEPROM), programmable ROM (PROM), a magnetic memory, a magnetic disk, and an optical disk The electronic apparatus 4000 may include, for example, portable mobile communication devices, smart phones, smart watches, PDAs, laptops, PCs, and other mobile or non-mobile computing devices, but embodiments are not limited thereto. The electronic apparatus 4000 may include autonomous driving vehicles such as unmanned vehicles, autonomous vehicles, robots, or drones, or IoT devices.

Figure 18:
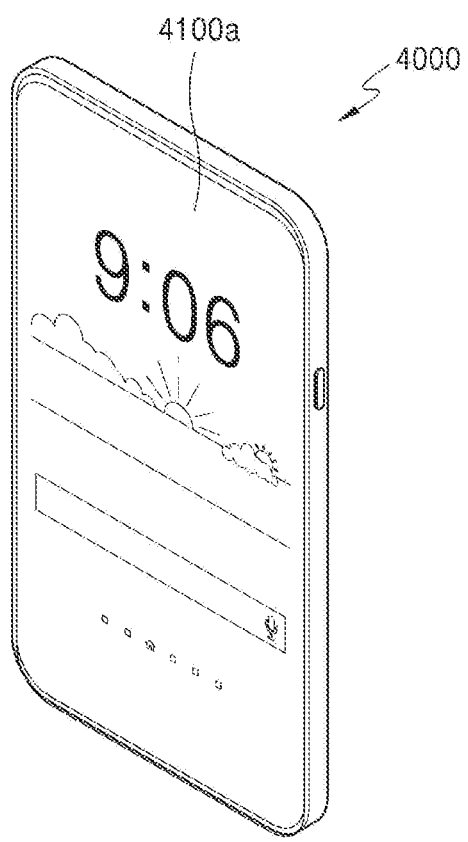
FIG. 18 is an exemplary perspective view illustrating the exterior of an electronic apparatus according to an example embodiment.

FIG. 18 is an exemplary perspective view illustrating the exterior of the electronic apparatus 4000 of FIG. 17.

The electronic apparatus 4000, as illustrated in the drawing, may employ a full-screen type display. The electronic apparatus may be a bezel-less type in which a display surface 4100*a* occupies most of the area of a front surface portion of an apparatus. Furthermore, the display surface 4100*a* may have a rectangular shape having no notch.

As described above, an illumination device according to example embodiments may be disposed at a rear surface of a display panel to illuminate a front surface of a display through an aperture of the display panel. Accordingly, a bezel-less, notch-free display having the illustrated exterior may be applied to the electronic apparatus 4000.

It should be understood that embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An illumination device comprising:
   a light source configured to emit light;
   a focusing lens configured to focus the light from the light source; and
   a display panel comprising an aperture through which the light focused by the focusing lens passes,
   wherein the light from the light source illuminates an object through the aperture, and
   wherein the aperture is provided corresponding to an area of 20×20 pixels or less with respect to pixels included in the display panel.

2. The illumination device of claim 1, wherein further comprising a surface light source layer disposed at a focal length of the focusing lens from the focusing lens.

3. The illumination device of claim 2, wherein the surface light source layer comprises a mask having a pattern configured to form structured light.

4. The illumination device of claim 3, wherein the mask comprises materials having different transmittances which are respectively configured to transmit the light emitted from the light source or block the light emitted from the light source.

5. The illumination device of claim 2, wherein the surface light source layer comprises a diffuser.

6. The illumination device of claim 5, wherein the diffuser comprises a microlens array, a metalens array, or a random optical structure.

7. The illumination device of claim 6,
   wherein the microlens array or the metalens array has a size that is equal to or less than a pitch of each of the plurality of light-emitting elements.

8. The illumination device of claim 6, wherein the random optical structure comprises grains, and each of the grains has an average size that is equal to or less than twice a wavelength of the light emitted from the light source.

9. The illumination device of claim 6, wherein the random optical structure comprises a meta-surface having a transmission phase.

10. An electronic apparatus comprising:
    an illumination device configured to emit light to an object;
    a sensor configured to receive light reflected from the object; and a processor configured to acquire information about the object based on the light received by the sensor, wherein the illumination device comprises:

a light source;

a focusing lens configured to focus the light from the light source; and an aperture through which the light focused by the focusing lens passes, wherein the aperture is provided corresponding to an area of 20×20 pixels or less with respect to pixels included in a display panel.

11. The electronic apparatus of claim 10, wherein further comprising a surface light source layer disposed at a focal length of the focusing lens from the focusing lens.

12. The electronic apparatus of claim 11, wherein the surface light source layer comprises a mask having a pattern configured to form structured light.

13. The electronic apparatus of claim 12, wherein the mask comprises materials having different transmittances which are respectively configured to transmit the light emitted from the light source or block the light emitted from the light source.

14. The electronic apparatus of claim 11, wherein the surface light source layer comprises a diffuser.

15. The electronic apparatus of claim 14, wherein the diffuser comprises a microlens array, a metalens array, or a random optical structure.

16. The electronic apparatus of claim 15, wherein the microlens array or the metalens array has a size that is equal to or less than a pitch of each of the plurality of light-emitting elements.

* * * * *